J. H. Congdon.

Self-Lubricating Cross-Heads.

Nº 86,214. Patented Jan. 26, 1869.

Witnesses;
Chas. Nida
Wm A Morgan

Inventor;
J. H. Congdon
per Munn & Co
Attorneys.

ISAAC H. CONGDON, OF OMAHA, NEBRASKA.

*Letters Patent No. 86,214, dated January 26, 1869.*

IMPROVEMENT IN SELF-LUBRICATING CROSS-HEADS FOR STEAM-ENGINES.

The Schedule referred to in these Letters Patent and making part of the same.

*To all whom it may concern:*

Be it known that I, ISAAC H. CONGDON, of Omaha, in the county of Douglas, and State of Nebraska, have invented a new and improved Self-Lubricating Cross-Head; and I do hereby declare that the following is a full, clear, and exact description thereof, which will enable those skilled in the art to make and use the same, reference being had to the accompanying drawings, forming part of this specification.

This invention relates to improvements in cross-heads for steam-engines, whereby it is designed to provide an improved means of lubricating them.

In the accompanying drawings—

Similar letters of reference indicate corresponding parts.

I propose to core out the two wings or slides of the cross-head, for the purpose of providing oil-reservoirs, A, (or they may be formed in any suitable manner,) and to connect the same by a passage, B, through the wrist C, into which reservoirs the oil may be supplied, from time to time, through oil-cups D, the air being allowed to escape through vent-plugs E.

In the faces of the slides or wings F, I provide circular or other-formed recesses, G, having connection with the oil-reservoirs, and in these recesses I place blocks, H, of anti-friction material, having dovetail or other-formed grooves in their faces, suitable for retaining gaskets, I, of absorbent-material, fitted in the said grooves, so that one portion will bear against the faces of the guides on which the cross-head slides, a free end, K, of the same extending into the oil-reservoirs, for the purpose of taking up the oil, and delivering it to the guides.

Figure 1:
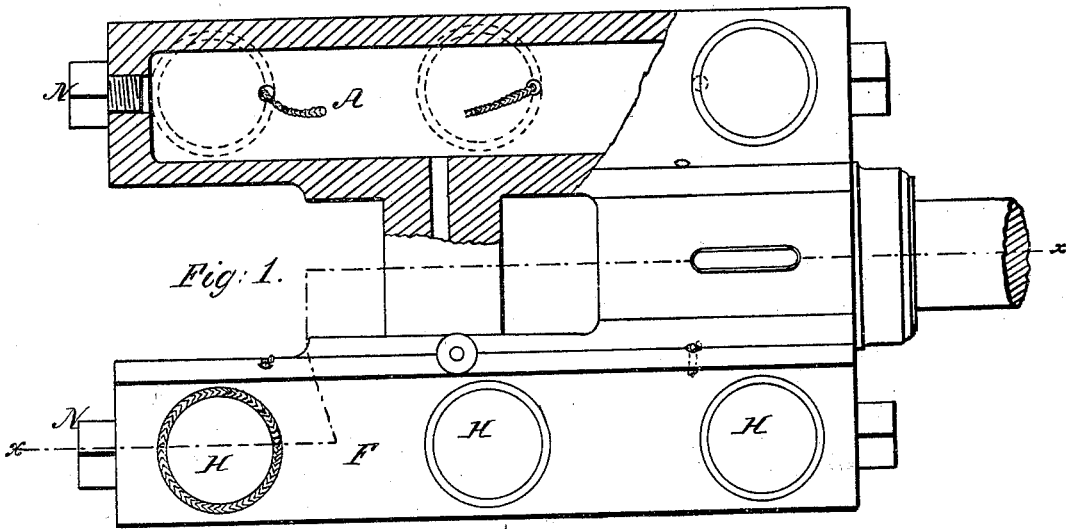
Figure 1 represents a broken plan view of a cross-head constructed according to my improvement.
Figure 2:
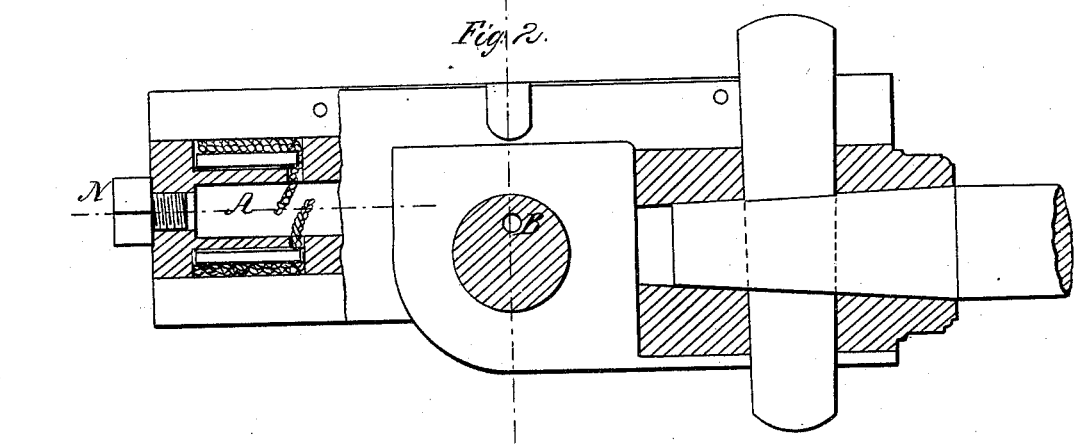
Figure 2 represents a sectional elevation of the same, taken on the line $x\ x$ of fig. 1.
Figure 3:
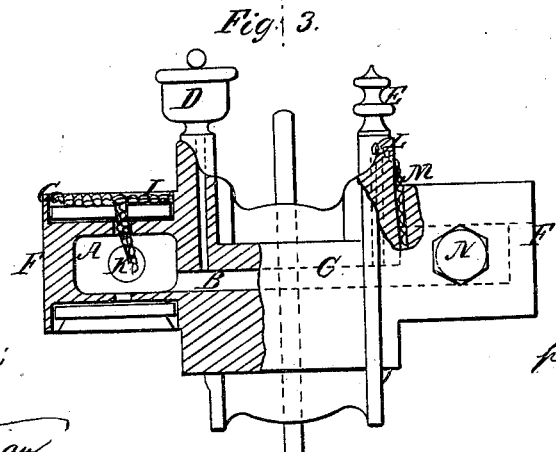
Figure 3 represents an end view, partly in section.

In order to insure the lubrication of the upper flanges I of the cross-heads, wicks, M, may be carried up from the reservoirs, through holes in the slides and grooves in the faces of the said flanges, terminating in holes, as represented in fig. 3, for supporting the said wicks.

The oil will flow naturally to the lower corresponding flanges.

Holes may be made in the wrist leading from the passage B to the exterior, for the purpose of lubricating it.

And in order to facilitate the cleaning of the reservoirs of sediment, plugs, N, may be tapped through the shell of the cross-head, at any suitable places.

It will be obvious that this arrangement will insure a constant and uniform lubrication, without waste of oil, as the flow may be governed in amount by the size or conducting-quality of the wicks, and that it may be applied to cross-heads for all purposes, whether for steam-engines or other uses.

I claim as new, and desire to secure by Letters Patent—

1. The cross-head of a steam-engine, or other mechanism, provided with the oil-reservoirs A, arranged to supply oil to the sliding parts, substantially as herein shown and described.

2. The combination, with the slides or flanges of the cross-head, of the grooved anti-friction blocks H, arranged in recesses in the wearing-surface of said slides or flanges, substantially as described.

3. A cross-head, whose wrist is provided with holes leading from its wearing-surface to the oil-reservoirs, substantially as herein described and specified.

4. The lubricating-gaskets I, arranged in combination with the grooved blocks H, and communicating with the reservoir A, substantially as specified.

5. The cross-head, having the oil-reservoirs A, as described, which are provided with the plugs N, substantially as specified.

ISAAC H. CONGDON.

Witnesses:
JOHN B. PITCHFORD,
J. B. SHEPHERD.